July 31, 1951     C. M. REIDER ET AL     2,562,846
DEHYDRATION OF ACROLEIN BY AZEOTROPIC DISTILLATION
Filed May 3, 1948
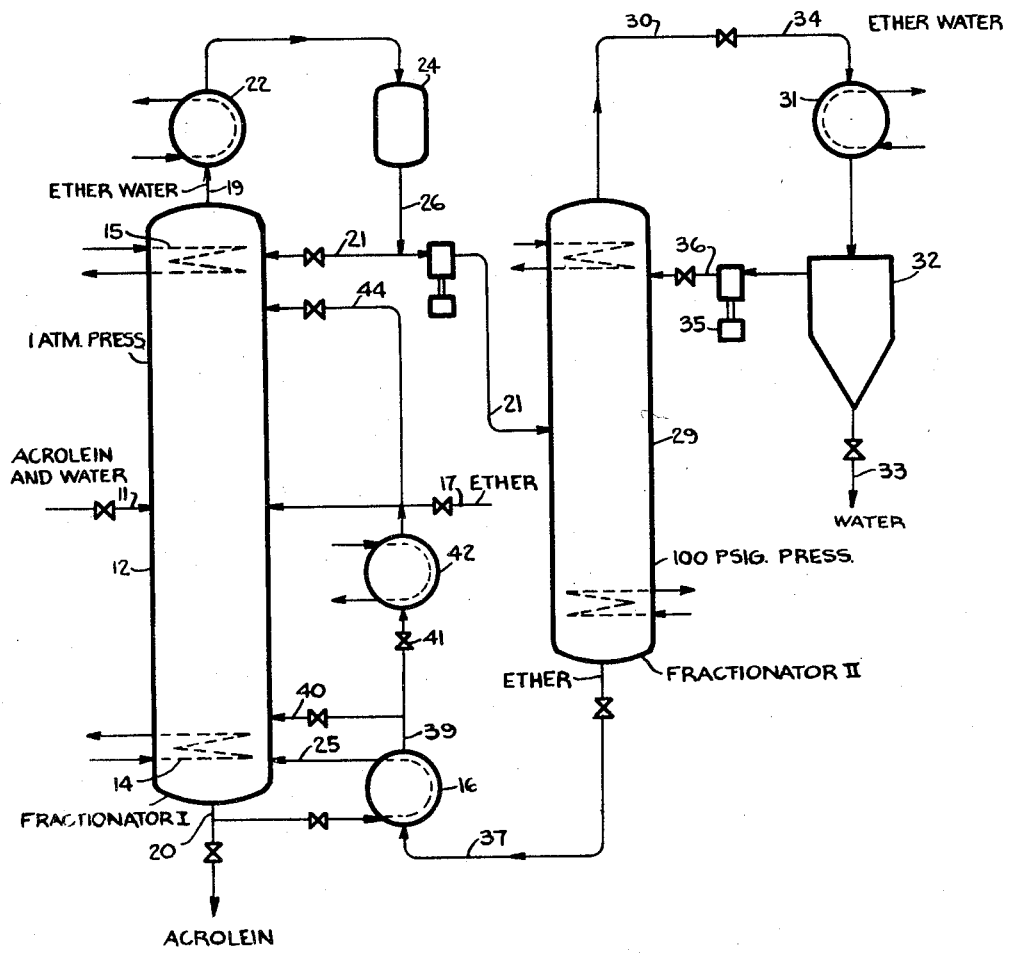
Inventors: Charles M. Reider
Gino J. Pierotti
By John H. Colvin
Their Agent Patented July 31, 1951

2,562,846

UNITED STATES PATENT OFFICE 2,562,846

DEHYDRATION OF ACROLEIN BY AZEOTROPIC DISTILLATION

Charles M. Reider, Alameda, and Gino J. Pierotti, Albany, Calif., assignors to Shell Development Company, San Francisco, Calif., a corporation of Delaware Application May 3, 1948, Serial No. 24,777

3 Claims. (Cl. 202—42)

This invention relates to a distillation process for the separation of components of a vaporizable liquid mixture involving the use of an entraining agent which is removed at least in part from the distilling zone in the overhead vapors. The invention is concerned more particularly with azeotropic distilling processes, and especially as applied to mixtures of liquid compounds which are difficult to separate by means of an ordinary distillation process.

It is well known to separate various mixtures of relatively similar volatile substances by distilling such mixtures in the presence of an "entraining agent" which materially alters the volatility ratio of the components of the mixture which it is desired to separate. Such entraining agents may be divided generally into two classes: those which in effect lower the boiling temperature of one of the components, generally by the formation of an azeotrope therewith; and those which in effect raise the boiling point of one of the components, generally by functioning as a selective solvent therefor. Thus, there is the one process known as azeotropic distillation and the other known as extractive distillation. It has been proposed to utilize both types of "entrainers" simultaneously in the same distilling column and in some instances it has been proposed to carry out the distillation process so that a single entrainer is removed from the distilling zone both in the bottoms stream and in the overhead stream.

Although separations by azeotropic distillation require the finding, largely by experiment, of suitable entrainers (azeotroping agents) for one of the components of the mixture, the method has met wtih considerable success and favor. However, even in some instances where suitable azeotroping agents have been found, the subsequent separation of the azeotroping agent from the azeotrope-forming constituent of the mixture has been unsatisfactory. Thus, whereas diethyl ether forms an azeotrope with water, and does not form a binary or ternary azeotrope with alcohol alone or with alcohol and water, and water may thereby be distilled from admixture with ethyl alcohol, there remains the problem of separating the ether from the water in the overhead product so that the process may be operated economically by reuse of the ether. But, in this instance, as well as in others, the composition of the azeotrope mixture is substantially the same as that of the entrainer, as a liquid, when saturated with the azeotrope-forming constituent.

It is, therefore, a principal object of the present invention to provide an azeotropic distillation process wherein the azeotroping agent, which will be referred to hereinafter more generally as the "entrainer," is more efficiently and effectively recovered for return to the distilling zone. Another object is to provide a more effective and economical coordinated combination process for the separation of two closely boiling constituents of a mixture by distilling the mixture in the presence of an entrainer which effects the lowering of the effective vapor pressure of a first one of the constituents relative to a second one of the constituents and which entrainer distills overhead with said first constituent, for recovering the entrainer which distills overhead from said first constituent and returning said recovered entrainer. Still another object of the invention is to provide an economical distillation process for the removal of water from admixture with substances which are relatively unstable at even substantially moderate temperatures, and particularly such substances which also have lower boiling temperatures than water and are relatively soluble in water. A more specific object is to provide an effective process for the dehydration of water-containing solutions of acrolein, of acrylonitrile, of allyl alcohol, etc. These objects will be better understood and other objects will become apparent from the description of the invention.

Now, in accordance with the present invention, it has been found that an improved distillation separation process is provided for separating two volatile liquids by the combination of steps: (1) distilling a mixture of the two substances in the presence of an entrainer and thereby producing an overhead fraction containing essentially the effectively more volatile of the two substances and a substantial proportion of the entrainer, and a bottoms fraction containing a major proportion of the other of the two substances in said mixture, said overhead fraction containing a major proportion of the effectively lower boiling constituent thereof; (2) distilling said overhead fraction at a substantially higher pressure than the pressure of the prior distillation, thereby producing a separated fraction which is enriched with respect to the entrainer; and (3) returning the enriched fraction to the first distilling zone. The enriched fraction will be separated from the second distilling operation as a bottoms fraction in those cases where the concentration of the entrainer in its azeotrope with the azeotrope-forming constituent with which it is admixed in the overhead from the first distillation decreases with an increase in pressure. This is generally true when the heat of vaporization of the entrainer is substantially lower than the heat of vaporization of the constituent of the original mixture with which it forms an azeotrope.

When the entrainer is recovered in an enriched form as bottoms product from the distillation at the higher pressure, as described in the foregoing, any separated phase from the overhead product of the distillation at said higher pressure, which overhead is enriched with respect to the azeotrope-former from the original mixture, may be redistilled again at a pressure which is substantially lower than the pressure at which said second distillation is carried out with the formation of a third bottoms product containing essentially said azeotrope-former and a third overhead fraction which is enriched, relative to the second overhead product, with respect to the entrainer and therefore may be returned to the high pressure distillation zone for recovery of the entrainer therein.

Thus, the present invention provides a coordinated combination of operations involving a first distillation of a mixture of two, or two groups of, similarly volatile substances in the presence of an entrainer wherein a first overhead product is obtained which contains substantially only one, or one group, of said volatile substances and at least a substantial proportion of said entrainer, and one or more coordinated subsequent distillation operations for the recovery of the entrainer from said overhead, for reuse in said first distillation, at least one of which subsequent distillations is carried out at a pressure which is substantially higher than the pressure of said first distillation and which is sufficiently higher to yield a product therefrom which is substantially enriched in said entrainer, relative to said first overhead product.

The process of this invention is applicable for the separation of various mixtures. Some representative mixtures are: acrolein and water; acrylonitrile and water; allyl alcohol and water; methyl acrylate and water; and allylamine and water.

In general, the process of the invention is applicable to mixtures where the ratio of one substance to another therein may range from a relatively small fraction to a relatively large value. Preferably, it is applied to mixtures in which the substance (or substances) to be separated as bottoms product in the first distillation represents a major proportion of the mixture, i. e. more than 50%. The invention is particularly applicable to mixtures wherein the minor constituent makes up not over 10% by weight of the mixture.

Having described the invention in a general manner, it will be more readily understood from descriptions of preferred embodiments thereof which will be made with reference to the accompanying drawing, which is made a part of the specification, and wherein the sole figure is a flow diagram representing an application of the invention to the dehydration of acrolein admixed with water.

Referring to the drawing, a mixture of acrolein and water is separated in fractionator I by distilling at atmospheric pressure in the presence of ethyl ether, which forms a primary azeotrope with the water boiling at 34.15° C. under atmospheric pressure, and the overhead azeotrope from fractionator I is then distilled in fractionator II at an elevated pressure, such as 100 p. s. i. g. (pounds per square inch gage). Recovered, substantially pure, ether is withdrawn from the bottom of fractionator II and recycled to fractionator I, while an overhead secondary azeotrope of ether and water, which is enriched with respect to water over the primary azeotrope from fractionator I, is obtained, and after condensing at about room temperature the separated ether layer is returned as reflux to fractionator II.

Described more specifically, and with reference to an actual application of the invention, an acrolein-water mixture, containing about 97.3% by weight acrolein and about 2.7% by weight water, such as may be obtained from dilute aqueous acrolein mixtures by a normal fractional distillation, is introduced as liquid through a valved line 11 into an intermediate section of a fractionating column 12 and is subjected therein to fractional distillation in the presence of ethyl ether. Fractionator 12 may be of any suitable design, such as a bubble-cap and plate design column or an open column packed with suitable packing means as well known in the art, such as Raschig rings, Berle saddles, and the like. It is provided with suitable heating means 14 and cooling means 15, as desired and required, and a reboiler 16. The ether is introduced from a suitable storage vessel (not shown) by means of a valved line 17. Heat is supplied to the materials in the fractionator 12 by means of heater 14, reboiler 16, and in the feed mixture so as to maintain distillation conditions therein and thereby to produce a substantially anhydrous (water-free) bottoms product which is withdrawn through a line 20 and an overhead primary azeotropic mixture of ether and water and also some acrolein which is withdrawn through a line 19. Ether and water form an azeotrope having a composition of 98.75% by weight ether and 1.25% by weight water with a boiling temperature of about 34.2° C. at 760 mm. of Hg pressure, while ether forms an azeotrope with about 0.29% by weight of acrolein, which azeotrope has a boiling point of 34.3° C. at 760 mm. of Hg pressure. Reflux is maintained in the column 12 by means of cooling coil 15 and reflux return of condensed overhead by means of reflux line 21, after condensation in condenser 22 and collecting in vessel 24. By the use of a column 12 containing 20 actual trays (equivalent to about 14 theoretical plates) above the feed port and utilizing a reflux to feed ratio therein of about 1.5, the overhead from said column has a composition of about 95.2% by weight ether, 3.5% by weight acrolein and 1.3% by weight water, with the column operating at atmospheric pressure. The 3.5% acrolein in the overhead product represents about 8% of the acrolein in the feed. With eleven actual plates (equivalent to about seven theoretical plates) between the feed port and the reboiler section and at a reflux to feed ratio therein of about 2.5, a bottoms product is obtained which is anhydrous acrolein containing about 0.1% ether. The temperature at the bottom of the column is maintained at about the boiling point of acrolein (52.5° C.). A portion of the anhydrous acrolein in line 20 may be heated in reboiler 16 by indirect heat exchange with hot bottoms from the subsequent distillation of the overhead from column 12 at superatmospheric pressure, and returned to the column through a line 25. The net overhead from the first distillation is transferred by means of a line 26 and a pump 27 to a second fractionating column 29 which is adapted to be operated at a superatmospheric pressure. The ether-water-acrolein mixture is subjected to fractional distillation at a pressure of about 100 p. s. i. g. (pounds per square inch gage) in fractionator 29, with a temperature near the top therein at about 102° C., which is the boiling temperature of the ether-water azeotropic mixture at that pressure, and a bottoms temperature of about 108° C., which is the boiling temperature of ethyl ether at 100 p. s. i. g. pressure. A secondary azeotropic mixture, which contains a substantially greater proportion of water than the primary azeotropic mixture from the distillation at atmospheric pressure, is withdrawn through line 30, cooled in condenser 31, and the ether and water phases are stratified in separator 32. It is advantageous to effect partial cooling of the vapor stream in line 30 by expansion cooling through a suitable expansion valve or engine 34, to atmospheric pressure. The stratified ether layer in separator 32, which is about 20 to 25 times the amount of the separated water layer, contains the major proportion of any acrolein in the mixture. This ether layer is returned to column 24 as reflux, by means of pump 35 and line 36. The water layer is withdrawn through line 33. The hot bottoms product, which contains most of the ether and the acrolein in the feed to column 29, and which is substantially anhydrous and is enriched with respect to ether, is returned by way of line 37, heat exchanger 16, line 39, expansion valve 41, cooler 41 if desired, and line 17 back to column 12. It is advantageous to return a portion of the recovered ether through line 40 and into a section of column 12 intermediate the bottom and feed port, particularly before removing all of the excess of heat therefrom. If desired, as will be readily determined by the preferred set of operating conditions, a portion or all of the entrainer, either or both the fresh and the recycled material, may be introduced at a higher point in column 12, as by line 44.

Various advantages are derived from the application of this invention to various distillation separation processes. In the illustrative embodiment as represented in the drawing, an important advantage is that the first distillation may be effected at a relatively low temperature, which is important to prevent chemical change of the acrolein, while the necessary ether recovery is effected from the first overhead by distillation at a higher temperature and pressure. When a similar acrolein mixture was heated to about 100° C., a solid material, presumably a polymer, was formed which adversely affects the operations of a distillation process.

Although the illustrative embodiments have utilized substantially atmospheric and super-atmospheric pressures, respectively, for the two successive distillations, it is only required that the second distillation (of the overhead from the first distillation) be carried out at a pressure which is sufficiently higher, generally at least twice as great, and preferably at least 5 times as great, in absolute pressure, than that of the preceding distillation. Thus, the first distillation may be at subatmospheric pressure and the second at atmospheric or superatmospheric pressure. The upper pressure limitation will depend on the particular substances involved. Thus, in general the pressure should be substantially lower than the critical pressure of the most volatile substance present. On account of physical requirements of operation and the like, it is preferred to use a pressure not above 150 to 200 p. s. i. g.

The drawing, for simplicity, does not necessarily show all of the auxiliary equipment such as pumps, pipes, valves, outlets, inlets, tanks, heating lines, cooling lines, heat exchangers, and the like, which may be found to be desirable for the most effective operation of the process as applied to a given case under a selected set of operating conditions. The proper selection and placement of such equipment will be evident to one skilled in the art in view of the description of the invention as made hereinbefore.

We claim as our invention:

1. A process of separating substantially anhydrous acrolein from an acrolein-water mixture which contains not more than 10% by weight of water, which process comprises: subjecting said mixture to a first distillation at substantially atmospheric pressure in the presence of ethyl ether and thereby producing a first bottoms fraction of substantially anhydrous acrolein and an overhead primary azeotropic mixture containing ether and the water content of said acrolein-water mixture; subjecting said primary azeotropic mixture to a second distillation at a pressure of at least five atmospheres absolute and thereby producing a second bottoms fraction which is substantially anhydrous ether and an overhead secondary azeotropic mixture which is enriched in water relative to the primary azeotropic mixture; condensing said secondary azeotropic mixture and stratifying the resulting condensate into an ether-rich phase and a water-rich phase and returning the ether-rich phase to the second distillation operation; and returning said second bottoms fraction of ether to said first distillation operation.

2. A process of separating substantially anhydrous acrolein from an acrolein-water mixture containing a minor but substantial proportion of water, which process comprises: subjecting said mixture to a first distillation at atmospheric pressure in the presence of ethyl ether and thereby producing a first bottoms fraction of substantially anhydrous acrolein and an overhead primary azeotropic mixture containing ether and the water content of said acrolein-water mixture; subjecting said primary azeotropic mixture to a second distillation at super-atmospheric pressure of at least two atmospheres absolute and thereby producing a second bottoms fraction which is substantially enriched in ether relative to the primary azeotropic mixture and an overhead secondary azeotropic mixture which is enriched in water relative to the primary azeotropic mixture; condensing said secondary azeotropic mixture and stratifying the resulting condensate into an ether-rich phase and a water-rich phase and returning the ether-rich phase to the second distillation operation; and returning said ether-enriched second bottoms fraction to said first distillation operation.

3. A process of separating substantially anhydrous acrolein from an acrolein-water mixture containing a minor but substantial proportion of water, which process comprises: subjecting said mixture to a first distillation at a pressure which is no higher than about atmospheric pressure in the presence of ethyl ether and thereby producing a first bottoms fraction of substantially anhydrous acrolein and an overhead primary azeotropic mixture containing ether and the water content of said acrolein-water mixture; subjecting said primary azeotropic mixture to a second distillation at superatmospheric pressure of at least two atmospheres absolute and thereby producing a second bottoms fraction which is substantially enriched in ether relative to the primary azeotropic mixture and an overhead secondary azeotropic mixture which is enriched in water relative to the primary azeotropic mixture; condensing said secondary azeotropic mixture and stratifying the resulting condensate into an ether-rich phase and a water-rich phase and returning the ether-rich phase to the second distillation operation; and returning said ether-enriched second bottoms fraction to said first distillation operation.

CHARLES M. REIDER.
GINO J. PIEROTTI.

REFERENCES CITED

The following references are of record in the file of this patent:

UNITED STATES PATENTS

| Number | Name | Date |
|---|---|---|
| 1,676,700 | Lewis | July 10, 1928 |
| 2,049,486 | Babcock | Aug. 4, 1936 |
| 2,140,694 | Evans | Dec. 20, 1938 |
| 2,184,563 | Othmer | Dec. 26, 1939 |
| 2,288,126 | Dunn et al. | June 30, 1942 |
| 2,290,636 | Deanesley | July 21, 1942 |
| 2,324,255 | Britton et al. | July 13, 1943 |
| 2,358,193 | Wentworth | Sept. 12, 1944 |
| 2,375,478 | Lake | May 8, 1945 |
| 2,381,876 | Carlson | Aug. 14, 1945 |
| 2,385,235 | Schneider | Sept. 18, 1945 |
| 2,398,689 | Bloomer | Apr. 16, 1946 |
| 2,411,437 | Lake | Nov. 19, 1946 |
| 2,445,738 | Willert | July 20, 1948 |
| 2,454,447 | Hearney et al. | Nov. 23, 1948 |

OTHER REFERENCES

Young: "Distillation Principles and Processes," published 1922 by MacMillan and Company Ltd., St. Martins Street, London, England.

Transactions of the American Institute of Chemical Engineers, vol. 36, 1940, pages 785–797.